United States Patent
Madelone, Jr. et al.

(10) Patent No.: US 10,919,115 B2
(45) Date of Patent: Feb. 16, 2021

(54) SYSTEMS AND METHODS FOR FINISHING ADDITIVE MANUFACTURING FACES WITH DIFFERENT ORIENTATIONS

(71) Applicant: General Electric Company, Schenectady, NY (US)

(72) Inventors: John Joseph Madelone, Jr., South Glens Falls, NY (US); Thomas Charles Adcock, Glenville, NY (US); John Broddus Deaton, Jr., Niskayuna, NY (US); Michael Evans Graham, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 16/007,336

(22) Filed: Jun. 13, 2018

(65) Prior Publication Data
US 2019/0381605 A1   Dec. 19, 2019

(51) Int. Cl.
  *B23K 26/354*  (2014.01)
  *B33Y 10/00*   (2015.01)
  *B33Y 30/00*   (2015.01)
  *B33Y 50/02*   (2015.01)
  *B23K 26/34*   (2014.01)

(52) U.S. Cl.
  CPC ............ *B23K 26/354* (2015.10); *B23K 26/34* (2013.01); *B33Y 10/00* (2014.12); *B33Y 30/00* (2014.12); *B33Y 50/02* (2014.12)

(58) Field of Classification Search
  CPC ......... B33Y 30/00; B33Y 50/02; B33Y 10/00; B23K 26/34; B23K 26/354
  USPC ............................ 219/121.65, 121.66, 76.12
  See application file for complete search history.

(56) References Cited

U.S. PATENT DOCUMENTS

| | | | |
|---|---|---|---|
| 5,105,062 A * | 4/1992 | Jones ................. | B23K 26/0604 219/121.85 |
| 5,155,324 A * | 10/1992 | Deckard ................. | B22F 3/004 264/497 |
| 5,269,056 A * | 12/1993 | Yang ................... | H01R 43/0221 29/879 |
| 6,269,540 B1 | 8/2001 | Islam et al. | |
| 7,077,638 B2 | 7/2006 | Leyden et al. | |

(Continued)

OTHER PUBLICATIONS

Mahamood et al., "Effect of laser power and powder flow rate on dilution rate and surface finish produced during laser metal deposition of Titanium alloy", 2017 8th International Conference on Mechanical and Intelligent Manufacturing Technologies (ICMIMT), pp. 6-10, Cape Town, Feb. 3-6, 2017.

(Continued)

*Primary Examiner* — Jimmy Chou
(74) *Attorney, Agent, or Firm* — Dority & Manning, P.A.

(57) ABSTRACT

An additive manufacturing system includes a build platform, at least one first consolidation device, and at least one second consolidation device. The at least one first consolidation device is configured to direct at least one first energy beam to a first face of a component. The first face has a first orientation. The at least one second consolidation device is configured to simultaneously direct at least one second energy beam toward a second face of the component as the first consolidation device directs the at least one first energy beam toward the first face. The second face has a second orientation different from the first orientation.

12 Claims, 4 Drawing Sheets

(56) References Cited

U.S. PATENT DOCUMENTS

| | | | | |
|---|---|---|---|---|
| 7,586,061 B2* | 9/2009 | Hoebel | ............... | B23K 26/032 219/121.83 |
| 9,511,447 B2* | 12/2016 | Lin | ............... | F23R 3/44 |
| 9,925,715 B2* | 3/2018 | Cheverton | ............ | B29C 64/393 |
| 10,335,901 B2* | 7/2019 | Ferrar | ............... | B23K 26/144 |
| 10,479,020 B2* | 11/2019 | Madigan | ............ | B23K 31/125 |
| 10,618,111 B2* | 4/2020 | Demuth | ............... | B22F 3/24 |
| 2002/0158051 A1* | 10/2002 | Heitel | ............... | B23K 26/10 219/121.63 |
| 2004/0198028 A1* | 10/2004 | Tanaka | ............... | B23K 26/0736 438/487 |
| 2004/0222197 A1* | 11/2004 | Hiramatsu | ............ | B23K 26/067 219/121.7 |
| 2005/0139582 A1* | 6/2005 | Tanaka | ............... | H01L 21/02672 219/121.75 |
| 2006/0243713 A1* | 11/2006 | Sato | ............... | G02B 26/10 219/121.68 |
| 2007/0108170 A1* | 5/2007 | Costin, Sr. | ............ | B23K 26/082 219/121.85 |
| 2007/0221639 A1* | 9/2007 | Yoshikawa | ............ | B23K 26/032 219/121.63 |
| 2010/0264302 A1* | 10/2010 | Philippi | ............... | B29C 64/268 250/252.1 |
| 2012/0237745 A1* | 9/2012 | Dierkes | ............... | A61K 6/818 428/215 |
| 2013/0108460 A1* | 5/2013 | Szwedowicz | ............ | B23K 26/342 416/241 R |
| 2013/0316185 A1* | 11/2013 | Evangelista | ............ | B23K 26/40 428/601 |
| 2014/0034622 A1* | 2/2014 | Barrett | ............... | B23K 33/004 219/121.64 |
| 2014/0183173 A1* | 7/2014 | Yeum | ............... | B23K 26/24 219/121.63 |
| 2014/0202742 A1* | 7/2014 | Jones | ............... | B23K 26/0006 174/253 |
| 2014/0245608 A1* | 9/2014 | Morimoto | ............ | B23K 26/1224 29/890.1 |
| 2014/0246809 A1 | 9/2014 | Hofmann | | |
| 2014/0263222 A1* | 9/2014 | Tseng | ............... | B23K 26/355 219/121.76 |
| 2014/0348691 A1* | 11/2014 | Ljungblad | ............ | B22F 3/1055 419/53 |
| 2014/0348692 A1* | 11/2014 | Bessac | ............... | B29C 64/141 419/53 |
| 2015/0064048 A1* | 3/2015 | Bessac | ............... | B33Y 30/00 419/29 |
| 2015/0158111 A1* | 6/2015 | Schwarze | ............ | B23K 26/34 219/121.34 |
| 2015/0165547 A1* | 6/2015 | Lin | ............... | F23R 3/002 60/752 |
| 2015/0210013 A1* | 7/2015 | Teulet | ............... | B29C 64/135 264/497 |
| 2015/0298253 A1* | 10/2015 | Costin, Jr. | ............... | D06P 5/15 219/121.68 |
| 2015/0306667 A1 | 10/2015 | Yao | | |
| 2015/0343561 A1* | 12/2015 | Miller | ............... | B23K 26/082 219/121.81 |
| 2015/0375456 A1* | 12/2015 | Cheverton | ............ | B23K 26/032 264/406 |
| 2016/0016255 A1* | 1/2016 | Bruck | ............... | G01B 11/16 219/76.14 |
| 2016/0114431 A1 | 4/2016 | Cheverton et al. | | |
| 2016/0114432 A1* | 4/2016 | Ferrar | ............... | B29C 64/393 219/76.12 |
| 2016/0121430 A1* | 5/2016 | Deiss | ............... | B23K 26/354 219/76.12 |
| 2016/0136730 A1* | 5/2016 | McMurtry | ............ | G02B 26/101 425/162 |
| 2016/0144571 A1* | 5/2016 | Philippi | ............... | B29C 64/386 264/497 |
| 2016/0221264 A1 | 8/2016 | Doherty et al. | | |
| 2016/0282839 A1 | 9/2016 | Soshi | | |
| 2016/0318129 A1* | 11/2016 | Hu | ............... | B29C 64/282 |
| 2016/0347001 A1* | 12/2016 | Katakura | ............... | B22F 3/1055 |
| 2017/0144224 A1 | 5/2017 | Demuth et al. | | |
| 2017/0165751 A1* | 6/2017 | Buller | ............... | B29C 64/40 |
| 2017/0197278 A1* | 7/2017 | Garry | ............... | B29C 64/20 |
| 2017/0203517 A1* | 7/2017 | Crear | ............... | B29C 64/393 |
| 2017/0232512 A1 | 8/2017 | Joerger | | |
| 2017/0282244 A1* | 10/2017 | Mizuno | ............... | B28B 17/04 |
| 2017/0361404 A1* | 12/2017 | Huang | ............... | C23C 24/10 |
| 2018/0079003 A1* | 3/2018 | Lin | ............... | B23K 26/046 |
| 2018/0093416 A1* | 4/2018 | Prexler | ............... | B33Y 10/00 |
| 2018/0111219 A1* | 4/2018 | Ackelid | ............... | B33Y 30/00 |
| 2018/0154443 A1* | 6/2018 | Milshtein | ............... | B23K 26/10 |
| 2018/0178284 A1* | 6/2018 | Martin | ............... | B23K 26/0643 |
| 2018/0185959 A1* | 7/2018 | Mathews, Jr. | ............... | B23K 26/342 |
| 2018/0185963 A1* | 7/2018 | Ostroverkhov | ............... | B22F 3/1055 |
| 2018/0186082 A1* | 7/2018 | Randhawa | ............... | B33Y 50/02 |
| 2018/0207750 A1* | 7/2018 | Carter | ............... | B33Y 50/02 |
| 2018/0250744 A1* | 9/2018 | Symeonidis | ............... | B23K 26/704 |
| 2018/0250770 A1* | 9/2018 | Graham | ............... | B22F 3/1055 |
| 2018/0264726 A1* | 9/2018 | Shiomi | ............... | C04B 35/64 |
| 2018/0345405 A1* | 12/2018 | Ostroverkhov | ............... | B29C 64/153 |
| 2018/0370144 A1* | 12/2018 | Revanur | ............... | B22F 3/008 |
| 2018/0370146 A1* | 12/2018 | Domrose | ............... | B29C 64/153 |
| 2019/0054701 A1* | 2/2019 | Yoshinari | ............... | B33Y 50/02 |
| 2019/0061333 A1* | 2/2019 | Karp | ............... | B33Y 30/00 |
| 2019/0118481 A1* | 4/2019 | Brown | ............... | B22F 3/1055 |
| 2019/0151945 A1* | 5/2019 | Okazaki | ............... | B33Y 30/00 |
| 2019/0160539 A1* | 5/2019 | Lei | ............... | B33Y 30/00 |
| 2019/0160735 A1* | 5/2019 | Prakash | ............... | B23K 26/364 |
| 2019/0232428 A1* | 8/2019 | Roychowdhury | ............... | B22F 3/1055 |
| 2019/0240732 A1* | 8/2019 | Koch | ............... | B29C 64/153 |
| 2019/0270247 A1* | 9/2019 | Hyatt | ............... | B29C 64/295 |
| 2019/0283332 A1* | 9/2019 | Brown | ............... | B33Y 50/02 |
| 2019/0291211 A1* | 9/2019 | Tsuno | ............... | B33Y 30/00 |
| 2020/0004225 A1* | 1/2020 | Buller | ............... | B29C 64/393 |
| 2020/0016820 A1* | 1/2020 | Penny | ............... | B29C 64/393 |
| 2020/0055144 A1* | 2/2020 | Poprawe | ............... | B33Y 50/02 |
| 2020/0061908 A1* | 2/2020 | Yamada | ............... | B29C 64/268 |
| 2020/0061917 A1* | 2/2020 | Osborn | ............... | B29C 64/282 |
| 2020/0164464 A1* | 5/2020 | Sievers | ............... | B23K 15/0086 |

OTHER PUBLICATIONS

PCT, International Search Report for International Application No. PCT/US2019/036737, dated Oct. 9, 2019, 3 pps.

PCT, Written Opinion for International Application No. PCT/US2019/036737, dated Oct. 9, 2019, 6 pps.

Rombouts, M. et al, "Surface Finish after Laser Metal Deposition", Physics Procedia, vol. 41, Apr. 9, 2013, pp. 810-814.

* cited by examiner

SYSTEMS AND METHODS FOR FINISHING ADDITIVE MANUFACTURING FACES WITH DIFFERENT ORIENTATIONS

BACKGROUND

The subject matter described herein relates generally to additive manufacturing systems and, more particularly, to finishing multiple faces of components manufactured using additive manufacturing systems, where each face has a different orientation.

At least some known additive manufacturing systems involve the consolidation of a particulate material to make a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and Laser-Cusing® systems, fabricate components using a focused energy source, such as a laser device or an electron beam generator, a build platform, and a particulate, such as, without limitation, a powdered metal. (LaserCusing is a registered trademark of Concept Laser GmbH of Lichtenfels, Germany.) In at least some DMLM systems, the focused energy source is positioned relative to the component such that the focused energy source is directed toward only one face of the component. This allows the focused energy source to consolidate the powdered metal and finish the component on that face of the component. However, at least some known components may require consolidation of powdered metal and finishing on other faces of the component.

BRIEF DESCRIPTION

In one aspect, an additive manufacturing system is provided. The additive manufacturing system includes a build platform, at least one first consolidation device, and at least one second consolidation device. The at least one first consolidation device is configured to direct at least one first energy beam to a first face of a component. The first face has a first orientation. The at least one second consolidation device is configured to simultaneously direct at least one second energy beam toward a second face of the component as the first consolidation device directs the at least one first energy beam toward the first face. The second face has a second orientation different from the first orientation.

In another aspect, a controller for use in an additive manufacturing system is provided. The additive manufacturing system includes at least one first consolidation device and at least one second consolidation device. The at least one first consolidation device is configured to direct at least one first energy beam to a first face of a component. The first face has a first orientation. The at least one second consolidation device is configured to simultaneously direct at least one second energy beam to at least one second face of the component as the first consolidation device directs the at least one first energy beam to the first face. The second face has a second orientation different from the first orientation. The controller is configured to receive a build file defining a plurality of first scan paths for the first consolidation device and a plurality of second scan paths for the second consolidation device. The controller is also configured to control the first consolidation device, based on the build file, to consolidate a plurality of first particles along the plurality of first scan paths to form at least a portion of the first face. The controller is further configured to control the second consolidation device, based on the build file, to direct the at least one second energy beam to the second face along the plurality of second scan paths.

In yet another aspect, a method of fabricating a particle containment system is provided. The method includes depositing particles onto a build platform. The method also includes distributing the particles to form a first face of a component. The method further includes operating at least one first consolidation device to consolidate a first plurality of particles along a first scan path along the first face. The first face has a first orientation. The method also includes simultaneously operating at least one second consolidation device to consolidate a second plurality of particles along a second scan path along a second face of the component as the at least one first consolidation device consolidates the first plurality of particles along the first scan path. The second face has a second orientation different from the first orientation.

DRAWINGS

These and other features, aspects, and advantages of the present disclosure will become better understood when the following detailed description is read with reference to the accompanying drawings in which like characters represent like parts throughout the drawings, wherein.

Figure 1:
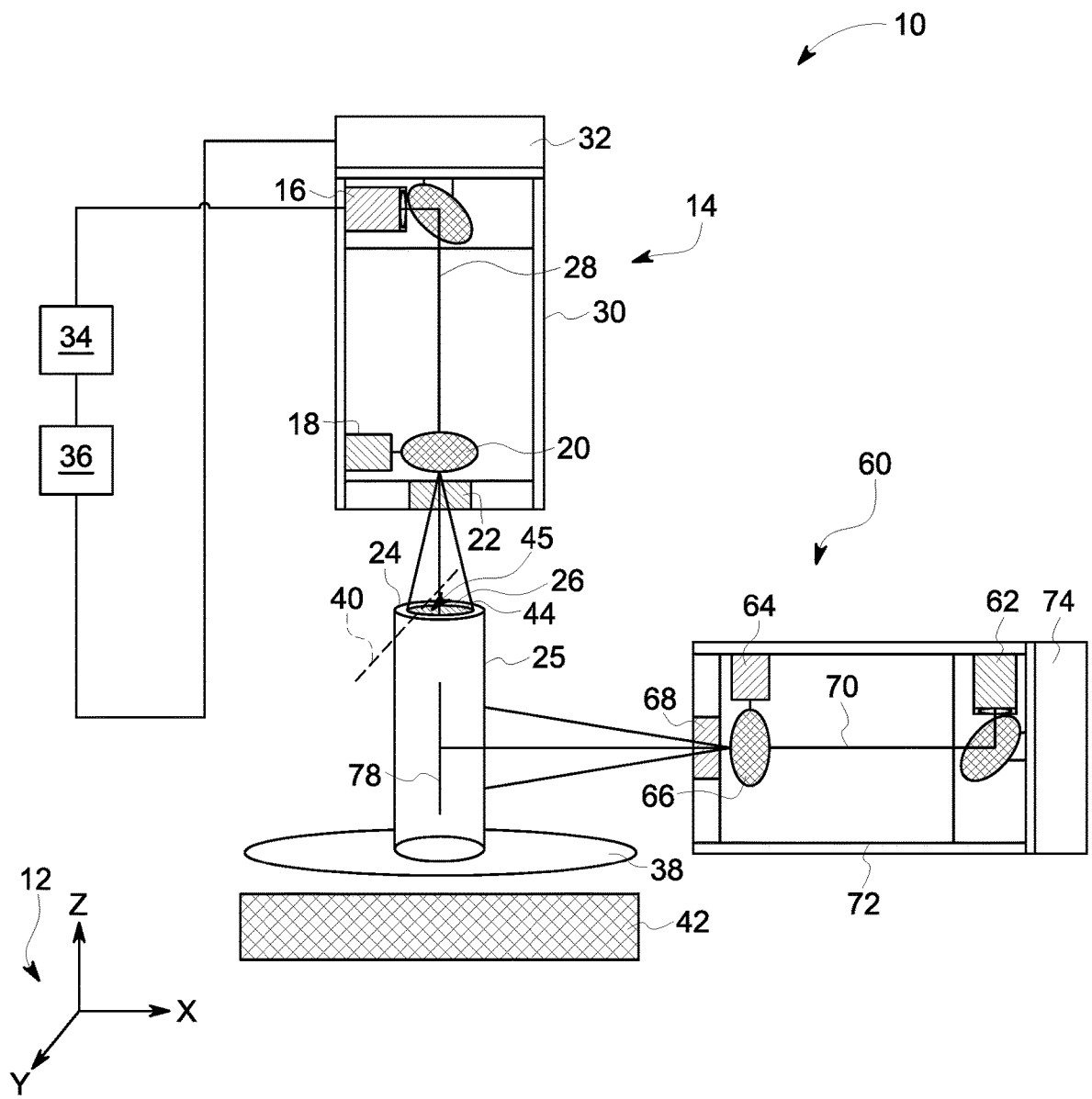
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the terms "consolidate" and "consolidation" refer to the process of melting a powdered material with a consolidation device such that the powdered material consolidates into a solid, integrally formed component once the melted powdered material has cooled. Furthermore, as used herein, the term "finish" refers to the process of smoothing or polishing a face of the component after consolidation of the powdered material into the solid component. The face of the component may be rough and dull after completion of the consolidation process. The face is finished by directing an energy beam to the face and melting only a top layer of the face such that the finished top layer is smooth and polished after the melted top layer cools to form a solid top layer.

The systems and methods described herein include an additive manufacturing system including a first consolidation device and a second consolidation device. The first consolidation device directs a first energy beam toward a first face of the component. The first face has a first orientation relative to a build plate. The second consolidation device directs a second energy beam toward a second face. The second face has a second orientation relative to the build plate different from the first orientation. In the embodiments described herein, the first face is a top build layer of the component and the second face is a face other than the top build layer of the component. The top build layer is offset from the build plate in the Z-axis and oriented substantially parallel to the build plate. The second face is oriented obliquely to both the first face and the build plate. Some examples of the second face include a side of the component or a down face of the component. Accordingly, the first consolidation device is offset from the build plate in the Z-axis and the second consolidation device is offset from the build plate in the X-axis, Y-axis, and Z-axis such that the second consolidation device is positioned circumferentially about the component. The arrangement of the first and second consolidation devices allows the additive manufacturing system to manufacture the component without a surrounding powder bed or support structures. The arrangement of the first and second consolidation devices also allows the second face to be manufactured by the second consolidation device as the first face is manufactured by the first consolidation device. The second consolidation device also finishes or smooths the second face while the first consolidation device manufactures and finishes the first face. As such, the arrangement of the first and second consolidation devices reduces the time, costs, and raw materials required to manufacture the component.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, LBM—Laser Beam Melting, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 10. A coordinate system 12 includes an X-axis, a Y-axis, and a Z-axis. In the exemplary embodiment, additive manufacturing system 10 includes a first consolidation device 14 including a first laser device 16, a first scanning motor 18, a first scanning mirror 20, and a first scanning lens 22 for fabricating a component 24 using a layer-by-layer manufacturing process. Alternatively, first consolidation device 14 may include any component that facilitates consolidation of a material using any of the processes and systems described herein. First laser device 16 provides a high-intensity heat source configured to generate a melt pool 26 (not shown to scale) in a powdered material using a first energy beam 28. First laser device 16 is contained within a first housing 30 that is coupled to a first mounting system 32. Additive manufacturing system 10 also includes a computer control system, or controller 34.

First mounting system 32 is moved by an actuator or an actuator system 36 that is configured to move first mounting system 32 in the X-direction, the Y-direction, and the Z-direction to cooperate with first scanning mirror 20 to facilitate fabricating a layer of component 24 within additive manufacturing system 10. For example, and without limitation, first mounting system 32 is pivoted about a central point, moved in a linear path, a curved path, and/or rotated to cover a portion of the powder on a build platform 38 to facilitate directing first energy beam 28 along the face of a plurality of particles 45 of a first face 44 to form a layer of component 24. Alternatively, first housing 30 and first energy beam 28 are moved in any orientation and manner that enables additive manufacturing system 10 to function as described herein.

First scanning motor 18 is controlled by controller 34 and is configured to move first scanning mirror 20 such that first energy beam 28 is reflected to be incident along a predetermined path along build platform 38, such as, for example, and without limitation, a linear and/or rotational scan path 40. In the exemplary embodiment, the combination of first scanning motor 18 and first scanning mirror 20 forms a two-dimension scan galvanometer. Alternatively, first scanning motor 18 and first scanning mirror 20 may include a three-dimension (3D) scan galvanometer, dynamic focusing galvanometer, and/or any other method that may be used to deflect first energy beam 28 of first laser device 16.

In the exemplary embodiment, build platform 38 is mounted to a support structure 42, which is moved by actuator system 36. As described above with respect to first mounting system 32, actuator system 36 is also configured to move support structure 42 in a Z-direction (i.e., normal to a top face of build platform 38). In some embodiments, actuator system 36 is also configured to move support structure 42 in the XY plane. For example, and without limitation, in an alternative embodiment where first housing 30 is stationary, actuator system 36 moves support structure 42 in the XY plane to cooperate with first scanning motor 18 and first scanning mirror 20 to direct first energy beam 28 of first laser device 16 along scan path 40 about build platform 38. In the exemplary embodiment, actuator system 36 includes, for example, and without limitation, a linear motor (s), a hydraulic and/or pneumatic piston(s), a screw drive mechanism(s), and/or a conveyor system.

In the exemplary embodiment, additive manufacturing system 10 is operated to fabricate component 24 from a computer modeled representation of the 3D geometry of component 24. The computer modeled representation may be produced in a computer aided design (CAD) or similar file. The CAD file of component 24 is converted into a layer-by-layer format that includes a plurality of build parameters for each layer of component 24, for example, first face 44 of component 24 including particles 45 to be consolidated by additive manufacturing system 10. In the exemplary embodiment, component 24 is modeled in a desired orientation relative to the origin of the coordinate system used in additive manufacturing system 10. The geometry of component 24 is sliced into a stack of layers of a desired thickness, such that the geometry of each layer is an outline of the cross-section through component 24 at that particular layer location. Scan paths 40 are generated across the geometry of a respective layer. The build parameters are applied along scan path 40 to fabricate that layer of component 24 from particles 45 used to construct component 24. The steps are repeated for each respective layer of component 24 geometry. Once the process is completed, an electronic computer build file (or files) is generated, including all of the layers. The build file is loaded into controller 34 of additive manufacturing system 10 to control the system during fabrication of each layer.

After the build file is loaded into controller 34, additive manufacturing system 10 is operated to generate component 24 by implementing the layer-by-layer manufacturing process, such as a direct metal laser melting method. The exemplary layer-by-layer additive manufacturing process does not use a pre-existing article as the precursor to the final component, rather the process produces component 24 from a raw material in a configurable form, such as particles 45. For example, and without limitation, a steel component can be additively manufactured using a steel powder. Additive manufacturing system 10 enables fabrication of components, such as component 24, using a broad range of materials, for example, and without limitation, metals, ceramics, glass, and polymers.

In the exemplary embodiment, additive manufacturing system 10 also includes at least one second consolidation device 60 including at least one second laser device 62, at least one second scanning motor 64, at least one second scanning mirror 66, and at least one second scanning lens 68 for fabricating component 24. Second consolidation device 60 is configured to finish or consolidate a second face 25. In the exemplary embodiment, additive manufacturing system 10 includes a single second consolidation device 60. Alternatively, additive manufacturing system 10 may include any number of second consolidation devices 60 that enable additive manufacturing system 10 to operate as described herein, including, without limitation, two, three, four, or more second consolidation devices 60 positioned circumferentially about component 24. Alternatively, second consolidation device 60 may include any component that facilitates consolidation of material using any of the processes and systems described herein.

Second laser device 62 provides a high-intensity heat source using at least one second energy beam 70 directed toward second face 25 of component 24. Second laser device 62 is contained within a second housing 72 that is coupled to a second mounting system 74. Second laser device 62 may be a dedicated laser device located within second consolidation device 60 or may be a centrally located laser device which transmits second energy beam 70 to second housing 72 via a fiber optic cable. Alternatively, first laser device 16 may transmit second energy beam 70 to second housing 72 via a fiber optic cable. Alternatively, additive manufacturing system 10 may include a plurality of second consolidation devices 60 each including a respective second housing 72 configured to receive second energy beam 70 from a single second laser device 62 via fiber optic cables. Alternatively, first consolidation device 14 and second consolidation device 60 may be one and the same. That is, first consolidation device 14 may be configured to operate in the same manner as second consolidation device 60 such that second consolidation device 60 is not required. Alternatively, second laser device 62 may include any component that transmits at least one second energy beam 70 to at least one second housing 72 using any of the processes and systems described herein.

Actuator system 36 is configured to move second mounting system 74 in the X-direction, the Y-direction, and the Z-direction to cooperate with second scanning mirror 66 to facilitate fabricating or finishing second face 25 of component 24 within additive manufacturing system 10. For example, and without limitation, second mounting system 74 is pivoted about a central point, moved in a linear path, a curved path, and/or rotated to cover a portion of second face 25 of component 24 to facilitate directing second energy beam 70 along second face 25 of component 24. Specifically, actuator system 36 may move second mounting system 74 circumferentially about component 24. Alternatively, second housing 72 and second energy beam 70 are moved in any orientation and manner that enables additive manufacturing system 10 to function as described herein.

Second scanning motor 64 is controlled by controller 34 and is configured to move second scanning mirror 66 such that second energy beam 70 is reflected to be incident along a predetermined path along second face 25 of component 24, such as, for example, and without limitation, a linear and/or rotational second scan path 78. In the exemplary embodiment, the combination of second scanning motor 64 and second scanning mirror 66 forms a two-dimension scan galvanometer. Alternatively, second scanning motor 64 and second scanning mirror 66 may include a three-dimension (3D) scan galvanometer, dynamic focusing galvanometer, and/or any other method that may be used to deflect second energy beam 70 of second laser device 62.

As described above with respect to first mounting system 32, actuator system 36 is also configured to move support structure 42 in a Z-direction (i.e., normal to a top face of build platform 38). In some embodiments, actuator system 36 is also configured to move support structure 42 in the XY plane. For example, and without limitation, in an alternative embodiment, actuator system 36 moves support structure 42 in the XY plane to cooperate with second scanning motor 64 and second scanning mirror 66 to direct second energy beam 70 of second laser device 62 along second scan path 78.

In the exemplary embodiment, additive manufacturing system 10 is operated to fabricate component 24 from the CAD file of component 24. Second scan path 78 is generated across the geometry of a plurality of respective layers along second face 25 of component 24. The build parameters are applied along second scan path 78 to fabricate that layer of component 24 from particles 45 used to construct component 24.

Figure 2:
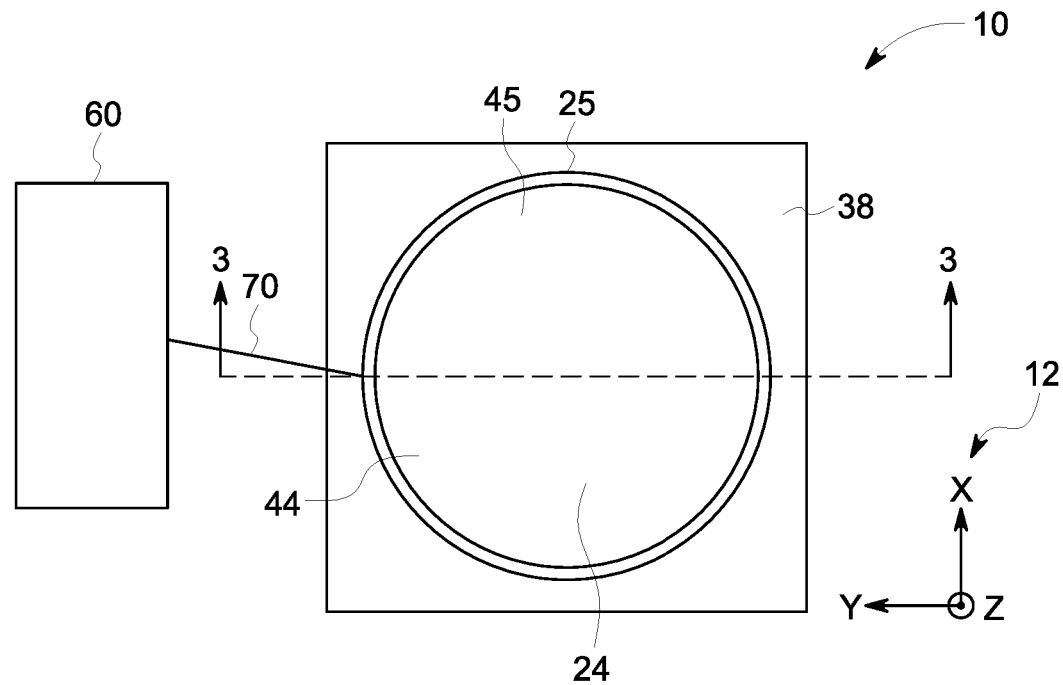
FIG. 2 is a plan schematic view of an exemplary component that may be manufactured with the system shown in FIG. 1.
Figure 3:
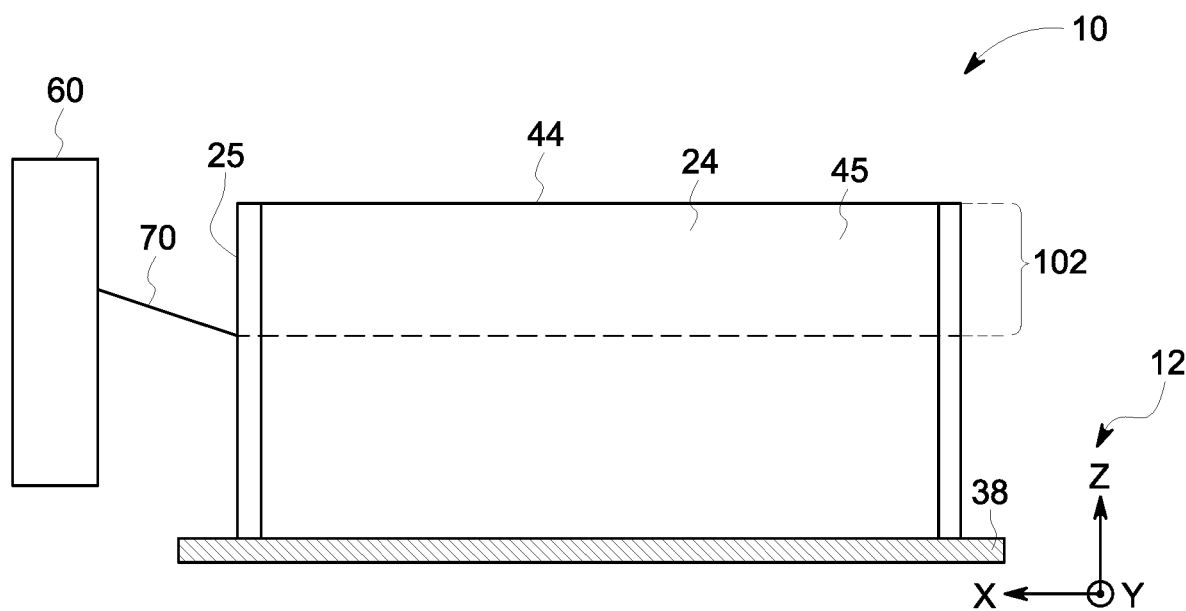
FIG. 3 is a section side schematic view of the component shown in FIG. 2.
Figure 4:
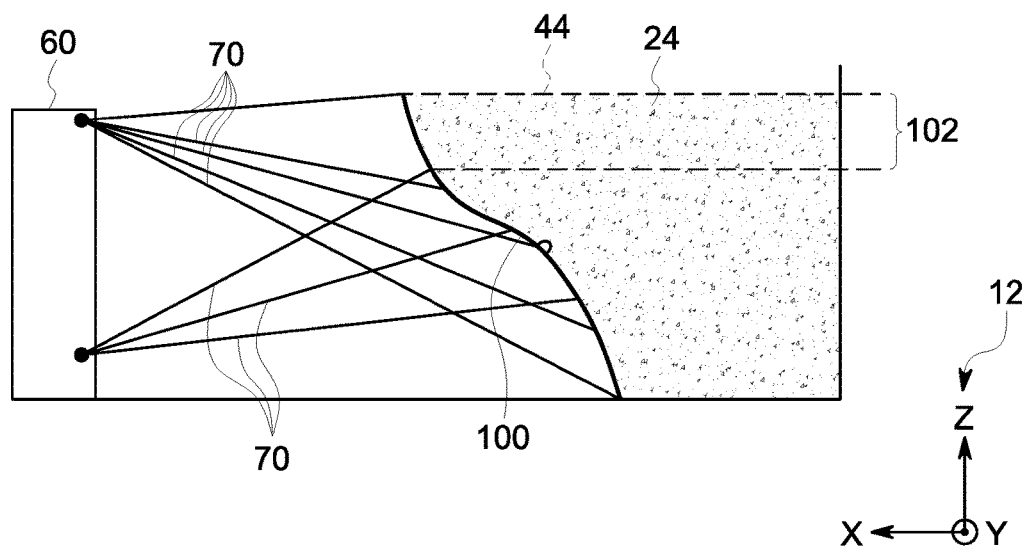
FIG. 4 is a section side schematic view of the component shown in FIG. 2 with a down facing face.

FIG. 2 is a plan schematic view of component 24 that may be used with additive manufacturing system 10. FIG. 3 is a section side schematic view of component 24 taken along line 3-3 (shown in FIG. 2). FIG. 4 is an enlarged schematic view of a region of component 24 with a down facing face 100. In the exemplary embodiment, component 24 includes a cylindrical second face 25. The shape and arrangement of component 24 and second face 25 are merely examples, and those of skill in the art will appreciate that component 24 and second face 25 may have any configuration that enables additive manufacturing system 10 to function as described herein. As shown in FIG. 4, component 24 may include down facing face 100.

As shown in FIGS. 1-4, first face 44 has a first orientation relative to build platform 38 and second face 25 has a second orientation relative to build platform 38. The first orientation is different than the second orientation. In the exemplary embodiment, first face 44 is a top build layer and second face 25 is a face other than the top build layer. The first face 44 is offset from build platform 38 in the Z-axis and oriented substantially parallel to build platform 38. Second face 25 is oriented substantially obliquely or orthogonally to both first face 44 and build platform 38. Second face 25 may be a side of component 24 or down facing face 100 of component 24. Second face 25 may be any face of component 24 that has a different orientation than first face 44. Down facing face 100 includes any exposed face oriented substantially downward or in the Z-direction opposite first face 44 of build platform 38.

Second consolidation device 60 is configured to finish or consolidate second face 25 and is positioned about component 24 such that second energy beam 70 directed toward second face 25. Accordingly, first consolidation device 14 is offset from build platform 38 in the Z-axis and second consolidation device 60 is offset from build platform 38 in the X-axis, Y-axis, and Z-axis.

As described above, component 24 is manufactured by dispensing particles 45 on first face 44 only in proximity to path 40. Component 24 is manufactured without a surrounding powder bed, clearing the space or volume around component 24. As such, there is a clear line of sight to second face 25 of component 24 from second consolidation device 60. This clear line of sight allows second laser device 62, second scanning motor 64, and second scanning mirror 66 to direct second energy beam 70 toward second face 25 of component 24. Second energy beam 70 finishes or consolidates second face 25 of component 24 during the additive manufacturing process.

During operations, first consolidation device 14 consolidates plurality of particles 45 of first face 44 into three forms of particles: consolidated particles or consolidated portions; sintered, unconsolidated particles; and unconsolidated particles. Consolidated particles are consolidated portions of second face 25 that are rough or unfinished. That is, the consolidated portion of second face 25 is solid, consolidated metal that is rough or unfinished. Sintered, unconsolidated particles are sintered powdered material within second face 25. The sintered, unconsolidated powdered material within second face 25 is powdered material that is a part of second face 25, but is still in powdered form. Unconsolidated particles are powdered particles positioned on second face 25 that have not been sintered into second face 25 or consolidated into second face 25. As first consolidation device 14 manufactures component 24, second consolidation device 60 is simultaneously manufacturing second face 25 such that a finished second face 25 is manufactured and no supporting structures are required. Second consolidation device 60 finishes second face 25 by directing second energy beam 70 directed toward second face 25 such that the consolidated portion of second face 25 is consolidated into a smooth second face 25; the sintered, unconsolidated particles are consolidated into second face 25; and the unconsoldiated particles positioned on second surface 25 are consolidated into second surface 25. Specifically, second energy beam 70 melts a portion of the consolidated portion of second face 25 such that surface tension causes the melted portion to consolidated into a smooth surface. Simultaneously, second energy beam 70 is melting the sintered, unconsolidated particles and the unconsolidated particles such that they are incorporated into the smooth second face 25.

Alternatively, first consolidation device 14 and second consolidation device 60 may be one and the same. That is, first consolidation device 14 may be configured to operate in a manner similar to second consolidation device 60 such that second consolidation device 60 is not required. Specifically, actuator system 36 is configured to move first mounting system 32 and first consolidation device 14 as described herein with respect second consolidation device 60 such that first consolidation device 14 is configured to finish or consolidate second face 25.

Typically, once component 24 has been substantially manufactured by additive manufacturing system 10, first consolidation device 14 is used to smooth or finish the final top face of component 24. However, because first consolidation device 14 is offset from component 24 along the Z-axis, first consolidation device 14 can only finish the top build layer of component 24. Second faces 25 of component 24 are typically finished in another finishing process (e.g. polishing or sanding). However, because second consolidation device 60 is positioned about component 24 such that second energy beam 70 is directed toward second face 25 of component 24, second consolidation device 60 can finish second face 25 while first consolidation device 14 is simultaneously manufacturing the rest of component 24, eliminating an extra manufacturing step.

Typically, a powder bed would surround and support second face 25 or down facing face 100 of component 24 during the manufacturing process. The powder bed would prevent second face 25 or down facing face 100 from collapsing. However, because second consolidation device 60 is positioned such that second energy beam 70 is directed toward either second face 25 or down facing face 100, second consolidation device 60 can consolidate second face 25 or down facing face 100 while first consolidation device 14 is simultaneously manufacturing the rest of component 24, eliminating the need for a support structure. That is, while first consolidation device 14 is manufacturing first face 44, second consolidation device 60 is simultaneously manufacturing second face 25 or down facing face 100 a distance 102 offset from first face 44 in the Z-axis toward build platform 38 such that second face 25 or down facing face 100 solidifies as component 24 is being manufactured. Consolidating second face 25 or down facing face 100 in close proximity to first face 44 hardens second face 25 or down facing face 100 before second face 25 or down facing face 100 collapses. As such, support structures are not required to manufacture component 24 with second face 25 or down facing face 100. The elimination of support structures to manufacture components 24 with second face 25 or down facing face 100 increases build speeds because additive manufacturing system 10 is not required to construct support structures during the manufacturing process. Additionally, the elimination of support structures also reduces the quantity of raw material necessary to construct component 24 because support structures are not required.

During manufacture of component 24, melt pool dynamics may cause defects within component 24. Because second consolidation device 60 is positioned such that second energy beam 70 is directed toward second face 25 of component 24, second consolidation device 60 may provide additional melt pool dynamic management capabilities which may reduce defects within component 24.

Figure 5:
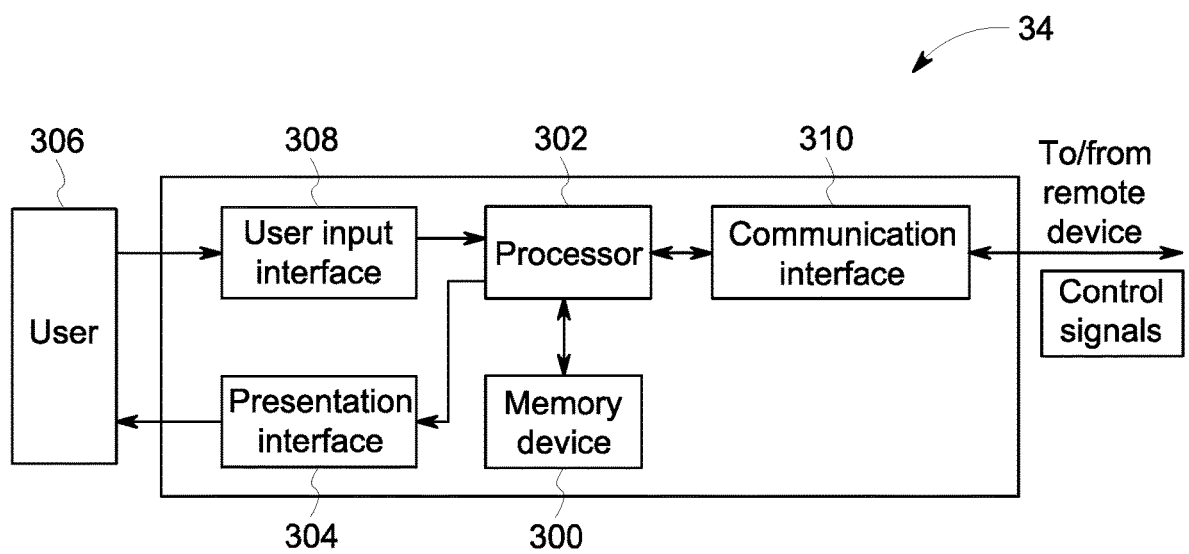
FIG. 5 is a block diagram of a controller that may be used to operate the additive manufacturing system shown in FIG. 1.

FIG. 5 is a block diagram of controller 34 that may be used to operate additive manufacturing system 10 (shown in FIG. 1). In the exemplary embodiment, controller 34 is any type of controller typically provided by a manufacturer of additive manufacturing system 10 to control operation of additive manufacturing system 10. Controller 34 executes operations to control the operation of additive manufacturing system 10 based at least partially on instructions from human operators. Controller 34 includes, for example, a 3D model of component 24 to be fabricated by additive manufacturing system 10. Operations executed by controller 34 include controlling power output of first and second laser devices 16 and 62 (shown in FIG. 1) and adjusting first and second mounting systems 32 and 74 and/or support structure 42, via actuator system 36 (all shown in FIG. 1) to control the scanning velocity of first and second energy beams 28 and 70. Controller 34 is also configured to control first and second scanning motors 18 and 64 to direct first and second scanning mirrors 20 and 66 to further control the scanning velocity of first and second energy beams 28 and 70 within additive manufacturing system 10. In alternative embodiments, controller 34 may execute any operation that enables additive manufacturing system 10 to function as described herein.

In the exemplary embodiment, controller 34 includes a memory device 300 and a processor 302 coupled to memory device 300. Processor 302 may include one or more processing units, such as, without limitation, a multi-core configuration. Processor 302 is any type of processor that permits controller 34 to operate as described herein. In some embodiments, executable instructions are stored in memory device 300. Controller 34 is configurable to perform one or more operations described herein by programming processor 302. For example, processor 302 may be programmed by encoding an operation as one or more executable instructions and providing the executable instructions in memory device 300. In the exemplary embodiment, memory device 300 is one or more devices that enable storage and retrieval of information such as executable instructions or other data. Memory device 300 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 300 may be configured to store any type of data, including, without limitation, build parameters associated with component 24. In some embodiments, processor 302 removes or "purges" data from memory device 300 based on the age of the data. For example, processor 302 may overwrite previously recorded and stored data associated with a subsequent time or event. In addition, or alternatively, processor 302 may remove data that exceeds a predetermined time interval. In addition, memory device 300 includes, without limitation, sufficient data, algorithms, and commands to facilitate monitoring of build parameters and the geometric conditions of component 24 being fabricated by additive manufacturing system 10.

In some embodiments, controller 34 includes a presentation interface 304 coupled to processor 302. Presentation interface 304 presents information, such as the operating conditions of additive manufacturing system 10, to a user 306. In one embodiment, presentation interface 304 includes a display adapter (not shown) coupled to a display device (not shown), such as a cathode ray tube (CRT), a liquid crystal display (LCD), an organic LED (OLED) display, or an "electronic ink" display. In some embodiments, presentation interface 304 includes one or more display devices. In addition, or alternatively, presentation interface 304 includes an audio output device (not shown), for example, without limitation, an audio adapter or a speaker (not shown).

In some embodiments, controller 34 includes a user input interface 308. In the exemplary embodiment, user input interface 308 is coupled to processor 302 and receives input from user 306. User input interface 308 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 304 and user input interface 308.

In the exemplary embodiment, a communication interface 310 is coupled to processor 302 and is configured to be coupled in communication with one or more other devices, such as first laser device 16, and to perform input and output operations with respect to such devices while performing as an input channel. For example, communication interface 310 may include, without limitation, a wired network adapter, a wireless network adapter, a mobile telecommunications adapter, a serial communication adapter, or a parallel communication adapter. Communication interface 310 may receive a data signal from or transmit a data signal to one or more remote devices. For example, in some embodiments, communication interface 310 of controller 34 may transmit/receive a data signal to/from actuator system 36.

Presentation interface 304 and communication interface 310 are both capable of providing information suitable for use with the methods described herein, such as, providing information to user 306 or processor 302. Accordingly, presentation interface 304 and communication interface 310 may be referred to as output devices. Similarly, user input interface 308 and communication interface 310 are capable of receiving information suitable for use with the methods described herein and may be referred to as input devices.

Figure 6:
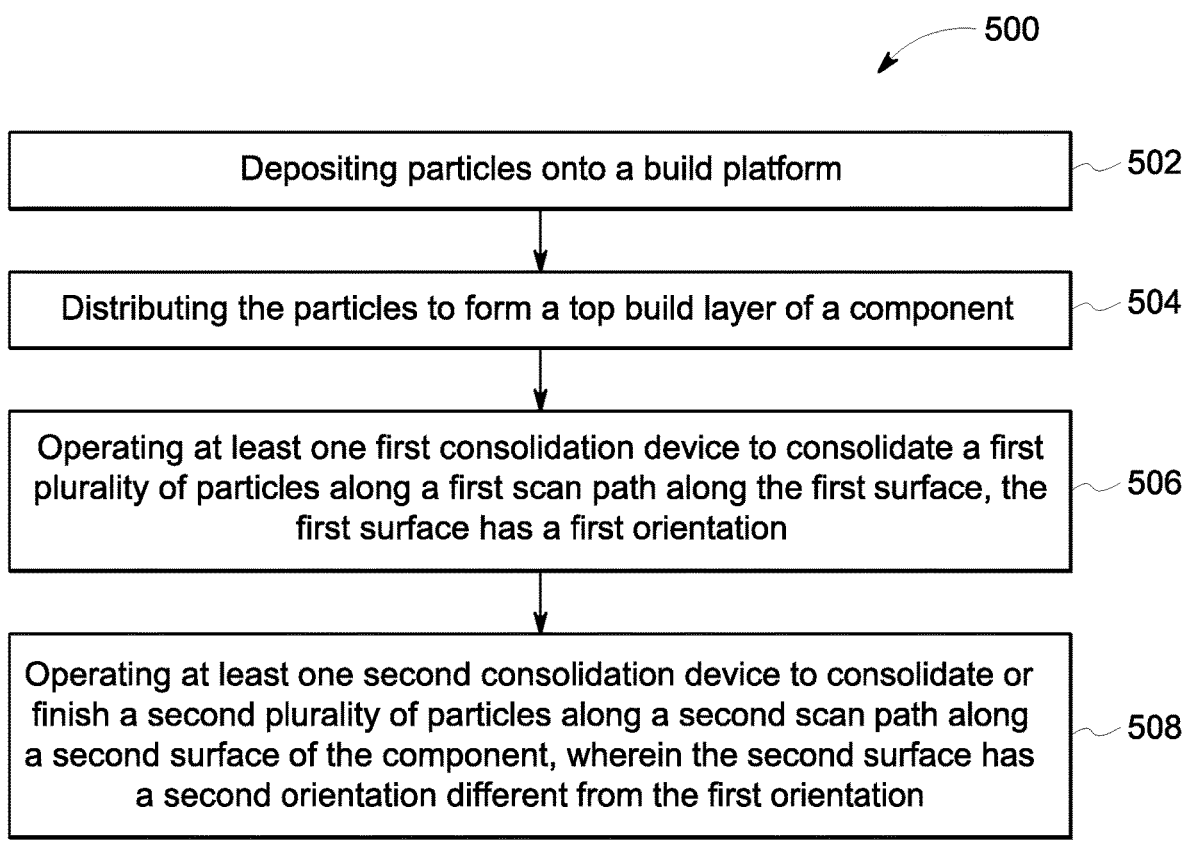
FIG. 6 is a flowchart of an exemplary method that may be used to fabricate the component shown in FIG. 2.

FIG. 6 is a flow chart illustrating a method 500 for fabricating component 24. Referring to FIGS. 1-5, method 500 includes depositing 502 particles 45 onto build platform 38. Method 500 also includes distributing 504 particles 45 to form first face 44. Method 500 further includes operating 506 at least one first consolidation device 14 to consolidate a first plurality of particles 45 along first scan path 40 along first face 44. First face 44 has a first orientation. Method 500 also includes operating 508 at least one second consolidation device 60 to consolidate or finish a second plurality of particles along a second scan path 78 along second face 25 of component 24. Second face 25 has a second orientation different from the first orientation.

The embodiments described herein include an additive manufacturing system including a first consolidation device and a second consolidation device. The first consolidation device directs a first energy beam toward a first face of the component. The first face has a first orientation relative to a build plate. The second consolidation device directs a second energy beam toward a second face. The second face has a second orientation relative to the build plate different from the first orientation. In the embodiments described herein, the first face is a top build layer of the component and the second face is a face other than the top build layer of the component. The top build layer is offset from the build plate in the Z-axis and oriented substantially parallel to the build plate. The second face is oriented obliquely to both the first face and the build plate. Some examples of the second face include a side of the component or a down face of the component. Accordingly, the first consolidation device is offset from the build plate in the Z-axis and the second consolidation device is offset from the build plate in the X-axis, Y-axis, and Z-axis such that the second consolidation device is positioned circumferentially about the component. The arrangement of the first and second consolidation devices allows the additive manufacturing system to manufacture the component without a surrounding powder bed or support structures. The arrangement of the first and second consolidation devices also allows the second face to be manufactured by the second consolidation device as the first face is manufactured by the first consolidation device. The second consolidation device also finishes or smooths the second face while the first consolidation device manufactures and finishes the first face. As such, the arrangement of the first and second consolidation devices reduces the time, costs, and raw materials required to manufacture the component.

An exemplary technical effect of the methods, systems, and apparatus described herein includes at least one of: a) reducing the amount of raw materials required to manufacture a component, b) reducing the time required for additively manufacturing a component, c) finishing a second face of a component, and d) reducing the cost of additively manufacturing a component.

Exemplary embodiments of additive manufacturing system including a second consolidation device positioned around a component are described above in detail. The additive manufacturing systems, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An additive manufacturing system comprising:
    a build platform;
    at least one first consolidation device configured to direct at least one first energy beam to a first face of a component, wherein the first face has a first orientation; and
    at least one second consolidation device configured to simultaneously direct at least one second energy beam toward a second face of the component as said first consolidation device directs the at least one first energy beam toward the first face, wherein the second face has a second orientation different from the first orientation, and wherein the second face of the component is a down facing face of the component, wherein said at least one second consolidation device comprises a plurality of second consolidation devices positioned circumferentially around the component.

2. The additive manufacturing system of claim 1, wherein said second consolidation device is configured to finish the second face of the component.

3. The additive manufacturing system of claim 1, wherein said second consolidation device is configured to consolidate the second face of the component.

4. The additive manufacturing system of claim 1, wherein the second face is oriented orthogonal to the first face.

5. The additive manufacturing system of claim 1 further comprising an actuator system coupled to said at least one second consolidation device and configured to move said at least one second consolidation device.

6. The additive manufacturing system of claim 5, wherein said actuator system is configured to move said at least one second consolidation circumferentially about the component.

7. The additive manufacturing system of claim 1, wherein the first face is offset from said build platform and is oriented parallel to said build platform.

8. The additive manufacturing system of claim 1, wherein the second face is oriented orthogonal to said build platform.

9. The additive manufacturing system of claim 1, wherein said at least one first consolidation device and said at least one second consolidation device are the same.

10. A method of fabricating a component, said method comprising:
    depositing particles onto a build platform;
    distributing the particles to form a first face of a component;
    operating at least one first consolidation device to consolidate a first plurality of particles along a first scan path along the first face, wherein the first face has a first orientation; and
    simultaneously operating at least one second consolidation device to consolidate a second plurality of particles along a second scan path along a second face of the component as the at least one first consolidation device consolidates the first plurality of particles along the first scan path, wherein the second face has a second orientation different from the first orientation, and wherein the second face of the component is a down facing face of the component, wherein operating at least one second consolidation device comprises operating a plurality of second consolidation devices comprises moving said at least one second consolidation device circumferentially around the component.

11. The method in accordance with claim 10, wherein the second face is oriented orthogonal to the first face.

12. The method in accordance with claim 10 further comprising operating the at least one second consolidation device to finish the second face.

* * * * *